United States Patent
Novak et al.

(10) Patent No.: US 6,295,586 B1
(45) Date of Patent: Sep. 25, 2001

(54) QUEUE BASED MEMORY CONTROLLER

(75) Inventors: Stephen T. Novak, Sunnyvale; Scott Waldron, Belmont; John C. Peck, Jr., San Francisco, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/205,665

(22) Filed: Dec. 4, 1998

(51) Int. Cl.[7] .................................................. G06F 12/00
(52) U.S. Cl. ..................... 711/154; 711/151; 711/158; 711/159; 365/203; 370/355
(58) Field of Search ................... 711/154, 158, 711/151, 159; 365/203; 370/355

(56) References Cited

U.S. PATENT DOCUMENTS

| | | | |
|---|---|---|---|
| 4,366,538 | * 12/1982 | Johnson et al. | 711/167 |
| 5,222,223 | * 6/1993 | Webb, Jr. et al. | 711/140 |
| 5,649,157 | * 7/1997 | Williams | 711/151 |
| 5,842,038 | * 11/1998 | Williams et al. | 710/5 |
| 5,907,857 | * 5/1999 | Biswas | 711/106 |
| 5,948,081 | 9/1999 | Foster | 710/40 |
| 6,128,749 | 10/2000 | McDonnell et al. | 713/600 |

FOREIGN PATENT DOCUMENTS

EP 51 426   12/1982   (WO) .

OTHER PUBLICATIONS

Micron Technology, Inc., Synchronous DRAM Data Sheet, 16Mb: x16 SDRAM.
Micron Technology, Inc., Synchronous DRAM Data Sheet, 64Mb: x4, x8, x16 SDRAM.
Micron Technology, Inc., Synchronous DRAM Data Sheet, 64Mb: x32 SDRAM.
Micron Technology, Inc., Synchronous DRAM Data Sheet, 128 MEG: x4, x8, x16 SDRAM.
Micron Technology, Inc., Synchronous DRAM Data Sheet, 256Mb: x4, x8, x16 SDRAM.

* cited by examiner

Primary Examiner—Do Hyun Yoo
Assistant Examiner—Mehdi Namazi
(74) Attorney, Agent, or Firm—Eschweiler & Associates, LLC

(57) ABSTRACT

A memory controller for a computer memory which decodes memory requests into individual primitive memory operations which are then queued into separate operation queues. The operation queues independently issue their queued primitive memory operations to the memory in order to initiate the memory request. The operation queues monitor and adhere to timing and ordering dependencies between the primitive memory operations that are queued and those that have already been transmitted to the memory. Once a primitive memory operation is transmitted to the memory, it is dequeued from its respective operation queue. A control queue monitors the progress of the primitive memory operations transmitted to the memory, completes the initiated memory request and provides timing and ordering dependency data to the operation queues.

20 Claims, 13 Drawing Sheets

SDRAM Timing Variables

| Timing Variable | Who is Responsible for Meeting Timing | Value (clock cycles) for CAS=3 | Value (clock cycles) for CAS=2 | Description |
|---|---|---|---|---|
| Tcl = Taa = CAS | RWQ | 3 | 2 | CAS latency. This is the fundamental timing number which communicates how many cycles it will take to activate or read data - this variable determines what the rest of the variables will be.<br>need to support TCL=4 for buffered SDRAM |
| Trcd | RWQ | 3-2 | 2 | RAS to CAS latency. Delay from activate to rd/wr command. |
| Trc | AQ | 8-7 | 5-7 | Bank Cycle Time - minimum time from activation to activation of same bank. Or auto refresh to activation(mode reg set command). |
| Tras | PQ | 5 | 3-5 | Minimum Bank active time - time from activation to pre-charge of same bank. |
| Trp | AQ | 3 | 2 | Pre-charge time - time from pre-charge command to when bank can be activated or (mode register set or refresh) again. |
| Trw | RWQ | 1/3 | 1/3 | My own timing variable - dictates R->W for how many NOP cycles must exist between Rd and WR and when data bus needs to be tristated before the last read data. Not configurable |
| Tprer=(Tcl-1) | PQ | 2 | 1 | Which data counting from the last one that pre-charge can be asserted. For example, Tprer=2 means pre-charge can be asserted coincident with the 2nd to valid data read. non-configurable - similar to Tdpl below but for reads |
| Tdpl = Twr | PQ | 2 | 1-2 | Data in to pre-charge-time from last valid write data to assertion of pre-charge. |
| Tdimm | RWQ | 1 | 1 | 1 cycle for DIMM turn-around time for PM. Non configurable |
| Tdal | AQ | 5 | 3 | Data into Active/Refresh - last data to activate of same bank - this is a combination of Tprer\| Tdpl and Tpr - not used in SMC |
| Trrd | AQ | 2 | 2 | Bank to different Bank in same slot Delay time - delay from activating two banks within the same slot. Non-configurable |
| Tccd | RWQ | 1 | 1 | CAS to CAS delay time-time from asserting 1 command to the next - not configurable always assumed to be 1 |
| Twl | RWQ | 0 | 0 | Write Latency - not configurable - always assumed to be immediate |
| Tdqw | RWQ | 0 | 0 | DQM Write Mask Latency - not configurable-always assumed to be immediate |
| Tdqz | RWQ | 2 | 2 | DQM Data Disable Latency - not configurable - assumed to be equal to CAS latency |

Fig. 4

High Level Dependencies

| Request category | Dependent on historical Pre-charges-Tras, Tprer, Twr? / PQ entry? | Dependent on historical Activates-Trc, Trp, Tdal, Trrd? / AQ entry? | Dependent on historical RW - Tcl, Trcd, Trw, Tdimm, Tccd, Twl, Tdqw, Tdqz? / RWQ entry? |
|---|---|---|---|
| PH | NO/NO | NO/NO | YES/YES |
| PMb | YES/NO | YES//YES | YES/YES |
| PMc | YES/YES | YES/YES - independent of PQ entry | YES/YES |
| Pre | YES/YES | YES/NO | YES/NO - must wait until last data write for CS or bank needed to be pre-charged is done. |

Fig. 5

Queue Issue Dependencies

| PQ dependency | PQ resolve dependency | AQ dependency | AQ resolve dependency | RWQ dependency | RWQ resolve dependency |
|---|---|---|---|---|---|
| Preceding RWQ entries | Add RWQ placeholder entry which frees this dependency when reach bottom of RWQ | Trc - previous activates | historical Activate count must be satisfied | Trcd | AQ dependency set by request decoder if NxtReq PMc or PMb - Trcd count must be met after AQ is issued. |
| PQ - RWQ want to issue at the same time | RWQ always has higher priority except in the case of <8QW PMc request in which case PQ has higher priority | Trp | historical pre-charge count must be satisfied | RWCQ - Trw, Tdimm, Tdqw, Tdqz, Tcl, | Look at appropriate bits in RWCQ to see whether RWQ is RdyToGo |
| Tras | historical Activate count must be satisfied | Trrd | Automatically met since only 1 activate queue entry | | |
| RWCQ- Tprer, Twr | Look at appropriate bits in RWCQ to see whether PQ is RdyToGo | | | | |
| Correct CS for PMc | MRA provides Pre_CS | | | | |

Fig. 6

RWQ Fields

| Field | Description |
|---|---|
| V | Valid RWQ entry. Possibly cleared by a BIU snoop. |
| Trcd_Cnt[2:0] | Trcd is initialized to Config_Trcd whenever an entry with AQ field set enters the oldest entry(RWQ[0]. This field is initialized with 1's corresponding to the number of cycles the transaction must wait. Every cycle that Aqdep is cleared this field is right shifted and the entry cannot be placed onto the SDRAM bus until Trcd_Cnt[0]=0. Ensures that read/write operations that require an activate issue after the activate completes. |
| PQDep | Prevents RWQ entry from issuing until corresponding PQ entry issues. |
| Aqdep | Activate Queue dependency. This field is set by the SMC_AQ signal for PMc and PMb MRA requests and cleared whenever an Activate transaction is retired by the AQ Accept signal, i.e. accepted by the SPM. |
| PMc | When an entry with this field enters the bottom of the RWQ it signals the PQ that it can now proceed and then this field must be cleared. This field used to synchronize PQ and RWQ. Also ensures of read/writes going to new CS's by adding 1 extra cycle of latency. |
| Pre | When an entry with this field enters the bottom of the RWQ it signals the PQ that it can now proceed and then this entry gets shifted out on the next cycle since it only serves as a placeholder in the RWQ and does not represent a valid Read or Write. |
| BL[2:0] | Burst length:<br>000=1QW; 001=2QW; 010=3QW; 011=4QW; 100=5QW; 101=6QW; 110=7QW; 111=8QW<br>Set by NxtReq_BL[2:0] |
| CS[7:0] | Determines CS that transaction requires<br>Set by NXtReq_CS[7:0] |
| Col[14:0] | Determines Bank and Col that transaction requires<br>Set by NXTReq_Col[14:0] |
| R | Read/Write:<br>1=Read<br>Set by NXTReq_R |
| ID[7:0] | See IGID description for more details<br>Set by NxtReq[4:0] |
| ECC | ECC = SMC_ECC=NxtReq_PartialWr &Config_ECC.<br>For reads this field tells the MDP to store SDRAM data into ECC merge buffer<br>For writes this field tells the MDP to merge incoming write data with the ECC merge buffer(according to incoming write data byte enables) and then use this merged data on the SDRAM data bus |

Fig. 7

RWQ Signals

| Signal Name | Purpose | Equation |
|---|---|---|
| RWQ_Pre | Tell PQ that its corresponding RWQ entry has reached the bottom of the queue. | RWQ0_Pre OR RWQ0_PMc (PMc field should be cleared 1 cycle after reaching the bottom of the RWQ. |
| RWQRdyToGo | Tells SPM that RWQ has a valid transaction to place onto the SDRAM command bus | RWQ0_Valid AND not RWQ0_Pre(not a dummy placeholder entry) AND RWQ0_PMC not set(to give PQ time to override RWQ priority) AND No RWCQ data conflicts (Read or Write transaction will not have any data conflicts with already issued transactions) |

Fig. 8

AQ Fields

| Field | Description |
|---|---|
| V | Valid AQ entry. This field is set by the incoming NxtReq_V signal |
| CS[7:0] | Determines CS that transaction requires<br>Set by NxtReq_CS[7:0] |
| Bank[1:0] | Bank that transaction requires<br>set by NxtReq_Bank[1:0] |
| Row[14:0] | Determines Bank and Row that transaction requires<br>Set by NxtReq_Row[14:0] |

Fig. 9

AQ Signals

| Signal Name | Purpose | Equation |
|---|---|---|
| AQRdyToGo | Tells SPM that AQ has a valid transaction to place onto the SDRAM command bus | AQ is valid AND Trc delay is met (LastActToBank > Trc & LastActToCS > Trc) AND Trp delay is met (LastPreBank > Trp). LastPreBank comes from the PQ and communicates the CS and Bank for any pre-charges issued in the last 2 cycles. |
| LastActToBank0-3 | Keep track of the number of cycles since the last active to given bank | Resets counter every time SPM accepts next AQ entry to that particular bank |
| LastActToCS0-5 | Keeps track of the number of cycles since last activate to given CS | Resets counter every time SPM accepts next AQ entry to that particular CS |

Fig. 10

PQ Fields

| Field | Description |
|---|---|
| V | Valid AQ entry. This field is set by the incoming NxtReq_V signal |
| CS[7:0] | Determines CS that transaction requires<br>Set by NxtReq_CS[7:0] |
| Bank[1:0] | Determines Bank that transaction requires<br>Set by NxtReq_Bank[1:0] |
| A10 | A10 - pre-charge all Banks. This is the case for PMc and PC. Only opportunistic pre-charges will not have this bit set. |
| RWQdep | PQ cannot be issued until corresponding entry in the RWQ reaches the bottom of its queue. This eliminates checking the entire RWQ for possible CS and Bank conflicts. |
| HiPrio | This field is set for PMc when the burst length for the preceding request was <8QW. This ensures that the previous transaction is terminated correctly. |

Fig. 11

PQ Signals

| Signal Name | Purpose | Equation |
| --- | --- | --- |
| PQRdyToGo | Tells SPM that PQ has a valid transaction to place onto the SDRAM command bus | PQ has a valid transaction AND RWQdep has been met AND no RWCQ data conflict (pre-charge will not violate currently outstanding data requests) AND Tras timing met (LastActToBank > Tras & LastActToCS>Tras) |
| PQ_A10 | Tells SPM whether to pre-charge all banks within a CS or just a selected Bank | PQ_A10 field |
| PQHiPrio | Tells SPM that PQ has higher priority than RWQ or AQ for this entry | PQHiPrio field |
| LastPreBank0-1 | Records any pre-charges for the last 2 cycles - used by AQ to determine Trp timing dependency | Shifted down from PQ every cycle - Valid if SPM accepts PQ entry otherwise shifted entry is invalid. |

Fig. 12

RWCQ Fields

| Fields | Description |
|---|---|
| VRd | Valid Read - SDRAM read data will be valid when this entry reaches RWCQ[0]. ACK is asserted whenever WRd[1] asserted - ACK sensitive to Tcl. The queue depth of this field is based on the burst length and CAS latency. For burst lengths up to 8 quadwords and CAS latency up to 3 cycles, this queue must be 12 entries deep (Including the current cycle entry). |
| NoAck | This bit is set if a kill signal terminates this request early. The queue depth of this field is 5. |
| FirstRdQW | Control signal to memory requestors that a request's first quadword has been issued. The queue depth of this field is 5. |
| DQM | By default this field is asserted to always tristate the data bus when not in use. A read and write must ensure that the DQM field is de-asserted correctly(2 clks before read, same clk for writes). The queue depth of this field is 9. |
| VWr | Valid Write. SDRAM write data will be valid when this entry reaches RWCQ[0] - REQ should be asserted whenever this VWr[1] asserted - to create a REQ signal which is asserted 1 cycle before write data is required by SDRAM. The queue depth of this field is based on the burst length configured in the SDRAM. For burst lengths up to 8 quadwords, the queue depth must be 8 entries (including the current cycle entry). |
| ID[7:0] | ID for transaction - defines the destination or source needed for data movement. While there must be 1 queue entry for each VRd entry, the top 8 entries in the queue will be identical, therefore this queue has only 4 entries. |
| CS[7:0] | CS for transaction - needed when ECC errors are detected to record which CS the problem occurred in. While there must be 1 queue entry for each VRd entry, the top 8 entries in the queue will be identical, therefore this queue has only 4 entries. |
| Bank[1:0] | Bank for transaction - needed when ECC errors are detected to record which bank the problem occurred in. While there must be 1 queue entry for each VRd entry, the top 8 entries in the queue will be identical, therefore this queue has only 4 entries. |
| ECC | For reads this field forces read data to be routed to the ECC merge buffer. For writes the field merges the data in the merge buffer with the incoming write data (according to incoming byte enables). |

Fig. 13

QUEUE BASED MEMORY CONTROLLER

RELATED APPLICATIONS

The following co-pending and commonly assigned U.S. patent applications have been filed on the same date as the present application. These applications relate to and further describes other aspects of the embodiments disclosed in the present application and are herein incorporated by reference.

U.S. patent application Ser. No.09/205,456, "METHOD AND APPARATUS FOR OPTIMIZING MEMORY PERFORMANCE WITH OPPORTUNISTIC PRE-CHARGING", filed concurrently herewith.

U.S. patent application Ser. No. 09,205,978, "METHOD AND APPARATUS FOR OPTIMIZING MEMORY PERFORMANCE WITH OPPORTUNISTIC REFRESHING", filed concurrently herewith, now U.S. Pat. No. 6,046,952.

FIELD OF THE INVENTION

This invention relates to computer systems and more particularly to memory control mechanisms and techniques employed within computer systems. This invention also relates to performance enhancement and optimization of memory control mechanisms for computer systems.

BACKGROUND OF THE INVENTION

A variety of techniques have been developed to increase the overall processing speed of computer systems. While improvements in integrated circuit processing technologies such as sub-micron processing capabilities have made it possible to dramatically increase the speed of the integrated circuitry itself, other developments in the architectures and bus transfer mechanisms of computer systems have also led to improvements in performance. Exemplary developments include the incorporation of cache memory subsystems as well as code pre-fetching mechanisms within computer systems.

In a typical computer system, memory accesses (reads or writes) are actually composed of discrete operations. An exemplary memory access to a dynamic random access memory (DRAM) (or alternatively synchronous DRAM (SDRAM or SynchDRAM) takes place as follows. The CPU determines that it needs to read or write some data to or from the memory. Note that DRAM based memory is organized by chip select (CS), bank and row. The CS signal is a unique signal that activates a particular group of memory chips in the memory for access. The bank and row refers to the physical design/organization of the chips themselves. Any access must be made by selecting a particular CS, bank and row (this combination is also known as a page). Further, DRAM type memory chips provide a row buffer (one per bank) which holds the data currently being accessed. Continuing with the example, the CPU will dispatch a request along with an address to the memory control logic to retrieve the desired data. The memory control logic will convert the address into a physical memory location consisting of a CS, bank, and row and then initiate the memory access as described below.

In order to access a particular row in the memory, if this row is not already active (see below), the bank containing that row must be pre-charged. Effectively, pre-charging raises all of the bit lines (the wires that connect the rows in each bank to the row buffer) to a voltage that represents a logical 1. When the page is activated (or connected to the bit lines), any bits in the page containing logical zeroes cause the respective bit lines to drop to logical zero. This saves time versus initializing the bit lines to logical zero and waiting for the bits in the page representing a logical 1 to charge up the respective bit lines. A pre-charge operation also causes any currently active row, from a previous access to the bank, to be written back to the memory array from the row buffer so that the data is not lost (see below). A CS or bank can be pre-charged in several ways. Pre-charging occurs upon initialization of the memory, whenever there is a refresh to that CS or whenever the memory control logic dispatches a pre-charge operation to that CS or bank. If the bank is not currently pre-charged, the memory control logic will issue a pre-charge operation to the desired CS in order to pre-charge the bit lines of the desired bank (or possibly all the banks) on that CS.

Next, an activate operation is sent to the desired CS and bank along with the row address in order to activate the particular page onto the bit lines and transfer the page of data into the bank's row buffer. Note that, due to the nature of DRAM memory, an activate operation destroys the contents of that row in the memory array in the process of moving those contents to the row buffer. In order to replace the contents back in the memory array and ensure they are not lost, a pre-charge operation (as discussed earlier) is necessary before activating another row into the row buffer. Once the page is in the row buffer, the appropriate read or write operation can be dispatched along with the column address identifying the bits to read or write. These operations initiate the memory request. The memory request is then completed by transferring the data to or from the memory. Note that once a row is activated and in the row buffer, the memory control logic can perform many reads and writes to that row without performing an additional pre-charge or activate operation.

As can be seen from the example, the initiation of an access to the memory can be broken down into the primitive operations of pre-charge, activate and read/write. Once initiated, the data transfer must then be completed to or from the memory. That is, for a read, the data must be taken in from the memory and passed back to the requestor and for a write, the data to be written must be sent to the memory.

It is well known in the art that state machine logic can be constructed to efficiently decode accesses, dispatch primitive operations, and control the completion of data transfers to optimize the use of the memory. However, the state machine logic needed to perform these operations, track dependencies among operations and dispatch and complete operations in parallel is often complex. This results in a complex design that requires more gates to implement and is harder to understand and verify.

Further, a complex design usually operates slower. Computer logic is typically designed around a clock signal which keeps operations within the computer synchronized. A typical design has logic stages, each stage of which includes input latches, output latches and combinational logic. The input latches are connected to the inputs of the combinational logic. The input latches latch and hold the input signals steady while the combinational logic operates on them. The output latches latch the output of the combinational logic. The input latches and output latches are also connected to the clock signal. The combinational logic consists of logic gates such as NAND or NOR gates arranged and connected to perform a logic function.

On each pulse of the clock signal, the input latches latch the input signals and make them available to the combinational logic and the output latches latch the output of the combinational logic. The logic stage takes advantage of the fact that the circuits that make up the gates of the combinational logic have propagation delays which introduce a delay between the time the input signals are latched and the time that the result of the combinational logic function is computed. The logic stage is designed so that the combinational logic finishes its computation (that all the signals have propagated through) before the next clock pulse hits the output latches. In this way, on each clock pulse, the inputs to the combinational logic change, and the output latches latch the result of the previous inputs. Since the output latches also form the input latches for the next logic stage, data is thereby moved from one stage of logic to the next.

Notice that the number of gates that can be put in a logic stage between the input and output latches is partly a function of the clock frequency of the computer. A faster clock frequency leaves less time for signals to propagate through the gates. A more complex design may require more gates between the input and output latches necessitating a slower clock. Therefore, the designer must often make a trade off between a fast clock and a complex logic design.

Accordingly there is a need to optimize and enhance the performance of accesses to the memory while simplifying the design of the memory control logic. Further, there is a need to reduce the logical complexity of the memory control logic which will in turn result in a reduction of the gate counts, the design time/cost and the number of design errors. This will further allow for a decrease in the number of gate delays between logic stages which will result in overall faster operation.

SUMMARY OF THE INVENTION

The problems outlined above are solved by an apparatus and method to send memory requests to a computer memory according to the present invention. In one aspect of the invention, a memory controller is provided which includes a request decoder that receives a memory request and decodes it into primitive memory operations and operation queues coupled to the request decoder and operative to store the primitive memory operations. The memory controller further includes a multiplexor coupled to the queues and the computer memory which is operative to select one primitive memory operation from the queues and transmit it to the computer memory in order to initiate the memory request. The queues are further operative to clear the selected primitive memory operation once transmitted by the multiplexor. The memory controller also includes control queues which are coupled to the operation queues and the computer memory and complete the memory requests in the computer memory once initiated.

The present invention further contemplates a method for executing memory requests to a computer memory using a memory controller, comprising the steps of: accepting a memory request from a memory request generator; decoding the memory request into one or more primitive memory operations; queuing the primitive memory operations into one or more operation queues; selecting one of the queued primitive memory operations for transmission to the memory; transmitting the queued primitive memory operation to the memory to initiate the memory request; dequeuing the queued primitive memory operation when the primitive memory operation has been transmitted to the memory; queuing control data into one or more control queues which then complete the memory request in the computer memory; and dequeuing the control data as the memory request completes.

As a result of the present invention, memory accesses are optimized and the performance of the main memory is enhanced. These advantages are achieved while simplifying the design of the memory access control logic and reducing its logical complexity. This, in turn, results in a reduction of the gate counts, the design time/cost and the number of design errors. In addition, the decrease in the number of gate delays between logic stages results in overall faster operation. The present invention also provides an easily adaptable structure that can be used with a variety of memory types.

BRIEF DESCRIPTION OF THE DRAWINGS

FIG. 4 is a timing variable table for the preferred queue structure of the SMC unit depicted in FIG. 2.

FIG. 5 is a table detailing high level queue dependencies of incoming requests for the preferred queue structure of the SMC unit depicted in FIG. 2.

FIG. 6 is a table detailing queue issue dependencies for the preferred queue structure of the SMC unit depicted in FIG. 2.

FIG. 7 is a table detailing the fields for each entry of the preferred read/write queue.

FIG. 8 is a table detailing important signals generated by the preferred read/write queue.

FIG. 9 is a table detailing the fields for each entry of the preferred activate queue.

FIG. 10 is a table detailing important signals generated by the preferred activate queue.

FIG. 11 is a table detailing the fields for each entry of the preferred pre-charge queue.

FIG. 12 is a table detailing important signals generated by the preferred pre-charge queue.

FIG. 13 is a table detailing the fields for each entry of the preferred read/write control queue.

DETAILED DESCRIPTION OF THE PRESENTLY PREFERRED EMBODIMENTS

Figure 1:
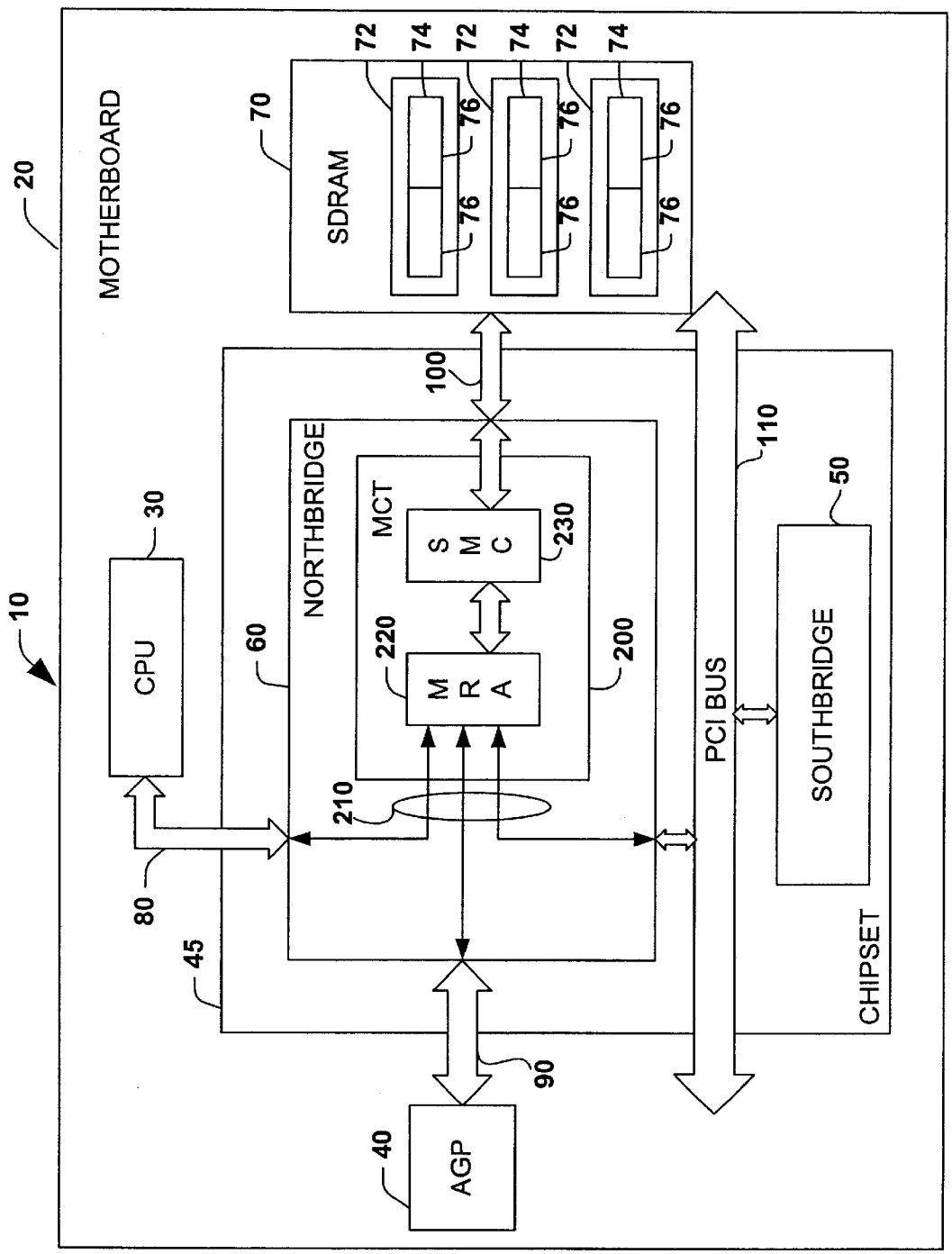
FIG. 1 is a block diagram of an exemplary computer system for use with the memory controller according to the preferred embodiment.

Turning now to the drawings, FIG. 1 shows selected components of an exemplary computer system 10 including a motherboard 20, a central processing unit (CPU) 30, an Advanced Graphics Port (AGP) 40, a chip set 45, a memory 70, a CPU bus 80, an AGP bus 90, a memory bus 100 and a PCI bus 110. It will be appreciated that CPU's 30, busses 90, 100, 110 and motherboards 20 are well known in the art. Further, it will be appreciated that the AGP 40 is but one example of a typical input/output (I/O) device included in the computer system 10, and that the computer system 10 can include a variety of I/O devices which are well known in the art.

The chip set 45 interconnects all of the components of the computer system 10 listed above to each other. In the preferred embodiment, the chip set 45 includes two chips known in the industry as the "Northbridge" 60 and "Southbridge" 50. Alternatively, the chip set 45 can include other chips and the Northbridge 60 and Southbridge 50 can, themselves, include more than one chip. An exemplary Northbridge 60 is the Irongate Northbridge chip manufactured by AMD, Inc. in Sunnyvale, Calif. The exemplary Northbridge 60 is designed to work with a motherboard 20 system bus clock speed of 100 MHZ, however higher clock rates can be used. The Northbridge 60 is designed to interconnect the memory 70 with the other devices in the computer system 10 that need to access the memory 70. Typically, these devices include the CPU 30 and newer technology I/O devices, such as the AGP 40 or I/O devices connected to the PCI bus 10, including the Southbridge 50. These devices are also known as memory requesters 210 and they make memory requests to the Northbridge 60 which then executes and completes these requests to the memory 70 (discussed in more detail below). The Southbridge 50 is usually designed to provide legacy compatibility with older technology I/O and interfaces these devices to the PCI bus 110. The exemplary Northbridge 60 is designed to connect to the CPU 30 using the CPU bus 80, to the AGP 40 using a dedicated AGP bus 90, to the memory 70 using a dedicated memory bus 100 and to all other devices using the PCI bus 110. It will be appreciated that the Northbridge can use other bus topologies to interconnect the various components on the motherboard 20.

The Northbridge chip includes a memory controller (MCT) 200 which controls and directs the flow of data between the memory requesters 210 and the memory 70 over the memory bus 100. The MCT 200 includes a memory request arbiter (MRA) 220 and an SDRAM memory controller (SMC) 230. The MCT 200 handles generation, prioritization and management of operations with the memory 70 (as explained below). Co-pending and commonly assigned applications entitled "METHOD AND APPARATUS FOR OPTIMIZING MEMORY PERFORMANCE WITH OPPORTUNISTIC PRE-CHARGING", Ser. No. 09/205,456, filed on Dec. 4, 1998 and "METHOD AND APPARATUS FOR OPTIMIZING MEMORY PERFORMANCE WITH OPPORTUNISTIC REFRESHING", Ser. No. 09/205,978, filed on Dec. 4, 1998, herein incorporated by reference, further describe operation of the MCT 200 for completing memory requests.

The memory 70 preferably includes several sockets 72 mounted on the motherboard 20 for receiving Dual Inline Memory Modules (DIMM's) 74. In the preferred embodiment, the motherboard 20 includes three sockets 72, each capable of holding one DIMM 74. Alternatively, single inline memory modules or other form of memory carrier can be used. The sockets 72 provide the connections between the DIMM's 74 and the memory bus 100. The memory bus 100 interconnects the memory 70 with the Northbridge 60. Each DIMM 74 includes a printed circuit board with one or more memory chips soldered to each side. In the preferred embodiment, these memory chips include synchronous dynamic random access memory (SDRAM) chips however, other types of DRAM memory chips can be used. Each side of the DIMM 74 is hereinafter referred to as a CS 76.

SDRAM chips are well known in the art as a derivative form of DRAM type memory. SDRAM chips can run at higher clock speeds than conventional DRAM by synchronizing their operations to the rest of the computer system 10. Further, SDRAM chips also provide a burst access mode which gives the additional advantage of higher access times to the memory 70. In burst access mode, the Northbridge 60 is able to retrieve more data from the memory 70 with each access. This cuts down the number of requests that need to be sent to the memory 70 which saves bandwidth on the memory bus 100. SDRAM chips contain a mode register which can be initialized to the desired burst data size. Once the mode register is set, each access to the memory 70 will cause the SDRAM chips to dump the set amount of data. For example, in the preferred embodiment the memory bus 70 is 64 bits wide. If the burst data size is set to 8 quad words (QW) or 64 bytes, the Northbridge 60 can dispatch the address of the first QW and then over the period of the next 8 clock cycles, the memory 70 will send 1 QW per cycle over the memory bus 100 to fulfill the request without further requests from the Northbridge 60.

Physically, the main memory of the computer system is typically divided by each CS. Each CS 76 is connected to a Chip Select (CS) signal on the memory bus 100 which is used by the Northbridge 60 to activate only those memory chips. There is a unique CS signal for each CS 76 allowing the Northbridge 60 to address each CS 76 independently. When a CS 76 is accessed, all memory chips that are a part of that CS are accessed simultaneously as though they were a single unit. This allows for interleaved accesses where if one CS 76 is busy servicing a request, the Northbridge 60 can send another request to another CS 76 without waiting for the first request to complete.

To further promote higher memory bandwidth, each CS 76 is typically divided into separate banks which can be independently accessed. This allows for interleaved memory accesses within a particular CS 76. The number of banks is dependent upon the manufacturer of the memory chips used in the DIMM 74. The physical layout of the memory storage circuits in each bank of each memory chip is usually in a grid arrangement (row/column) and the SDRAM provides inputs for a row address and a column address to access into this grid. Therefore, to access any location in the memory 70, the computer system 10 need only choose a particular CS 76, bank, row address and column address. In the preferred embodiment, each DIMM 74 has 2 CS 76 with each CS 76 having up to 4 banks, up to 8,192 ( 8 K) Rows and up to 2048 ( 2 K) Columns. The combination of specifying a particular CS 76, bank and row is also referred to herein as a page.

In addition, SDRAM memory chips provide buffer storage called an SDRAM row buffer (row buffer). There is usually one row buffer per bank. Once a page has been selected (also known as an Activate operation), the SDRAM will move the selected row into the bank's row buffer. From the row buffer, the column address is used to select the desired data for read or write operations. When a row is activated into the row buffer, the memory control logic must be sure to cause the row buffer contents to be stored back in the memory array before moving a different row into the row buffer (as discussed below).

For the exemplary Northbridge 60, memory requests to the memory 70 can be classified into three scenarios. These scenarios are also used to identify the primitive operations (pre-charge, activate and read/write) that the MCT 200 must send to the memory 70 in order to initiate the request. The first scenario is called a page hit (PH) when the memory request is directed to a page that is already active in the row buffer of a particular CS 76 and bank. This type of transaction has the lowest latency because only the read/write operation and the appropriate column address need to be dispatched to initiate the memory request. The only delay incurred is the turn around time of the memory 70 to send the appropriate data back or write the data to the row buffer in order to complete the request.

The second scenario is called a page conflict (PC). A PC occurs when the memory request is to a CS 76 and bank that currently has an active page in its row buffer but this request is directed to a different row. This scenario involves the longest latency due the fact that the bank must be pre-charged and then the new page must be activated into the row buffer before the read/write operation can be dispatched to initiate the request. In addition, further delay is introduced if the request that put the current page in the row buffer has not yet completed. Then the request for the new page must be stalled. When a PC occurs, the MCT 200 will need to dispatch a pre-charge, activate and read/write operation to the SDRAM.

The third scenario is called a page miss (PM). A PM occurs when the current request is to a bank that has no currently active page in its SDRAM buffer. PM's are of two types. The first is a PMc, where the current request is to a CS 76 different from the most recently accessed CS 76. The second is a PMb, where the current request is to the most recently accessed CS 76 but to a different bank than that already active in that CS 76. In a PM, the MCT 200 need only dispatch an activate operation to move the desired page into the row buffer followed by a read/write operation to initiate the request. For a PMc, a pre-charge operation is also sent to the last accessed bank in order to write the active row back to the memory array. Note that by pre-charging in this manner, a PM is guaranteed to be to a bank that is already pre-charged. If the bank were not already pre-charged, it would mean that there was an active row already in the row buffer, making this a PC scenario.

Further, in the exemplary computer system 10, pre-charge, activate and read/write operations require a certain amount of time to complete. Another operation to a particular CS 76 may have to wait to be dispatched until the prior operation has completed. These delays are also referred to as timing dependencies. For example, utilizing the exemplary SDRAM from Micron Technology, Inc. a typical pre-charge operation to a CS 76 takes 30 nano seconds (or 3 cycles on a 100 MHz system bus). This delay is also referred to as Trp. This means that the MCT 200 must wait for Trp before sending the subsequent activate operation to the CS 76. Further, once the activate operation is sent, it takes 30 nano seconds (or 3 cycles on a 100 MHz system bus) for the row to be moved into the SDRAM row buffer. This delay is referred to as Trcd. This means that the MCT 200 must wait for Trcd to dispatch the read or write operation. Note that if the next operation following the activate is a pre-charge, the delay before sending the pre-charge is referred to as Tdpl and may be different than Trcd. Further, only one bank of one CS 76 can send or receive data over the memory bus 100 at any given time. Once a bank begins to send or receive data to or from the MCT 200, subsequent read and write operations to any CS 76 (but not activates or pre-charges to other banks) must wait for the data to finish transferring. These operational/timing dependencies only occur on any one CS 76 and/or bank. Requests to more than one CS 76 or to a different bank can be dispatched in a parallel or interleaved fashion.

Figure 2:
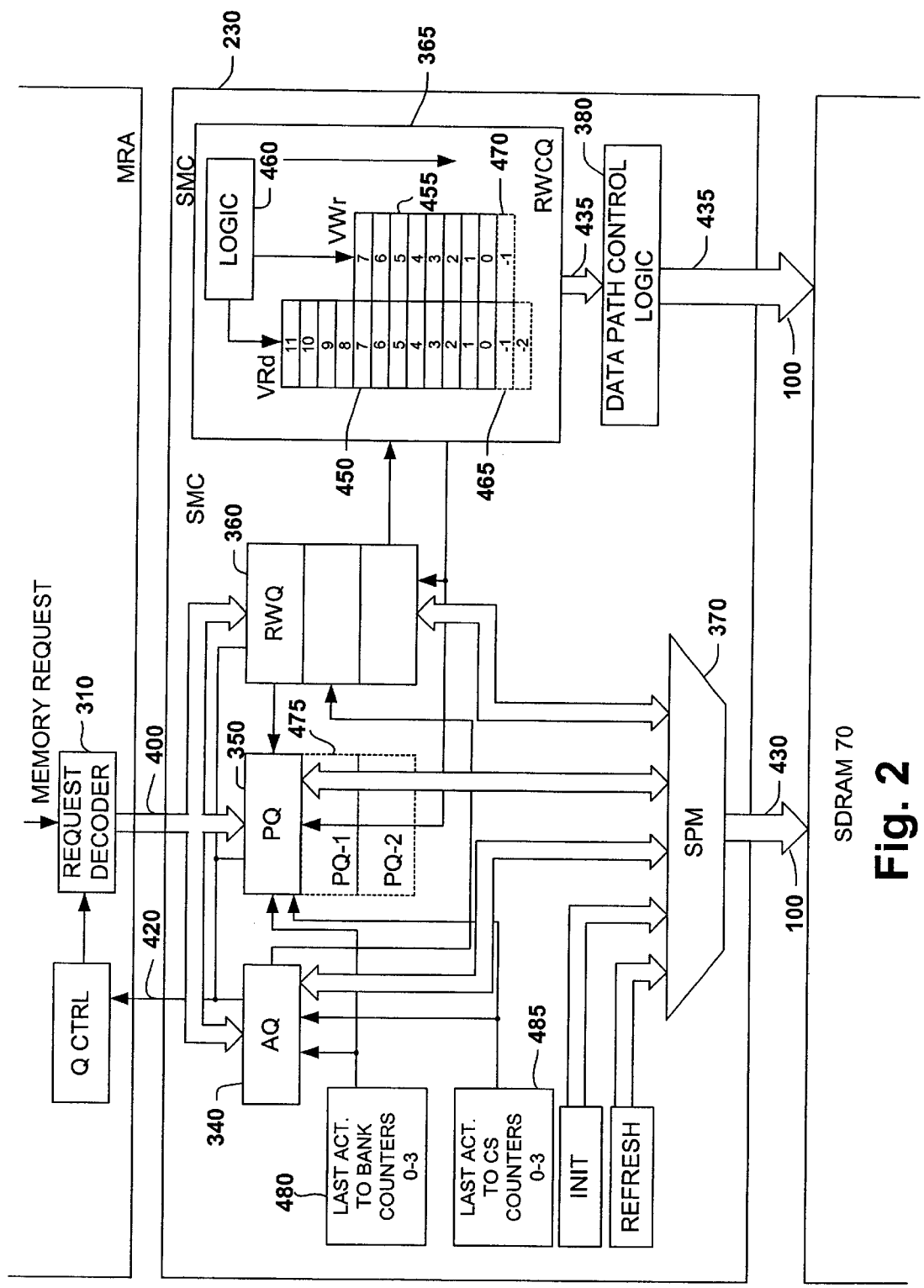
FIG. 2 is a block diagram depicting the MRA and SMC units of the memory controller of FIG. 1.

Referring now to FIG. 2, there is shown a more detailed view of the MRA 220 and SMC 230. The MRA 220 includes queue control logic 300 and a request decoder 310. The SMC 230 includes an activate operation queue (AQ) 340, a pre-charge operation queue (PQ) 350, a read/write operation queue (RWQ) 360, a read/write control queue (RWCQ) 365, an SDRAM priority multiplexor (SPM) 370 and data path control logic 380. The SMC 230 also includes a Next Request input 400 to receive the decoded primitive memory operations constituting the next memory request from the request decoder 310 in the MRA 220. Further, the SMC 230 includes a queue status output 420 to indicate to the MRA 220 whether the AQ 340, PQ 350 or RWQ 360 have available entries. The SMC 230 also has an SDRAM command bus output 430 connected to the memory bus 100 and a data bus control output 435 connected to the data path control logic 380. In the exemplary SMC 230, the AQ 340 and PQ 350 are each a one entry queue and the RWQ 360 is a three entry queue. Note that the PQ 350 also has two additional queue entries 475 which remember the last two issued pre-charge operations. These entries are used to resolve timing dependencies as discussed below and detailed in FIGS. 4–13.

The AQ 340 also includes two sets of counters 480, 485 which are used to measure the number of cycles from the last activate operation to a particular bank or CS 76. The first set of counters 480 includes four counters which count the number of cycles from the last activate to each bank of the currently active CS 76. These counters are reset whenever there is access to a new CS 76. The second set of counters 485 includes six counters which count the number of cycles from the last activate to each CS 76. Both sets of counters 480, 485 are used to resolve timing dependencies among the queues as discussed below and detailed in FIGS. 4–13.

The memory requesters 210 make various requests on the inputs of the MRA 220 for access to the memory 70. The MRA 220 selects one request to be sent to the SMC 230. The queue control logic 300 is connected to the queue status output 420 from the SMC 230 and determines whether or not a request can be sent to the SMC 230 (discussed below). If a request can be sent to the SMC 230, the request selected by the MRA 220 is passed to the request decoder 310. The request decoder 310 decodes the request into its primitive memory operations and transmits these primitive memory operations to the operation queues 340, 350, 360 in the SMC 230 via the next request input 400. In the exemplary SMC 230, the request decoder 310 is implemented in combinational logic.

Figure 3:
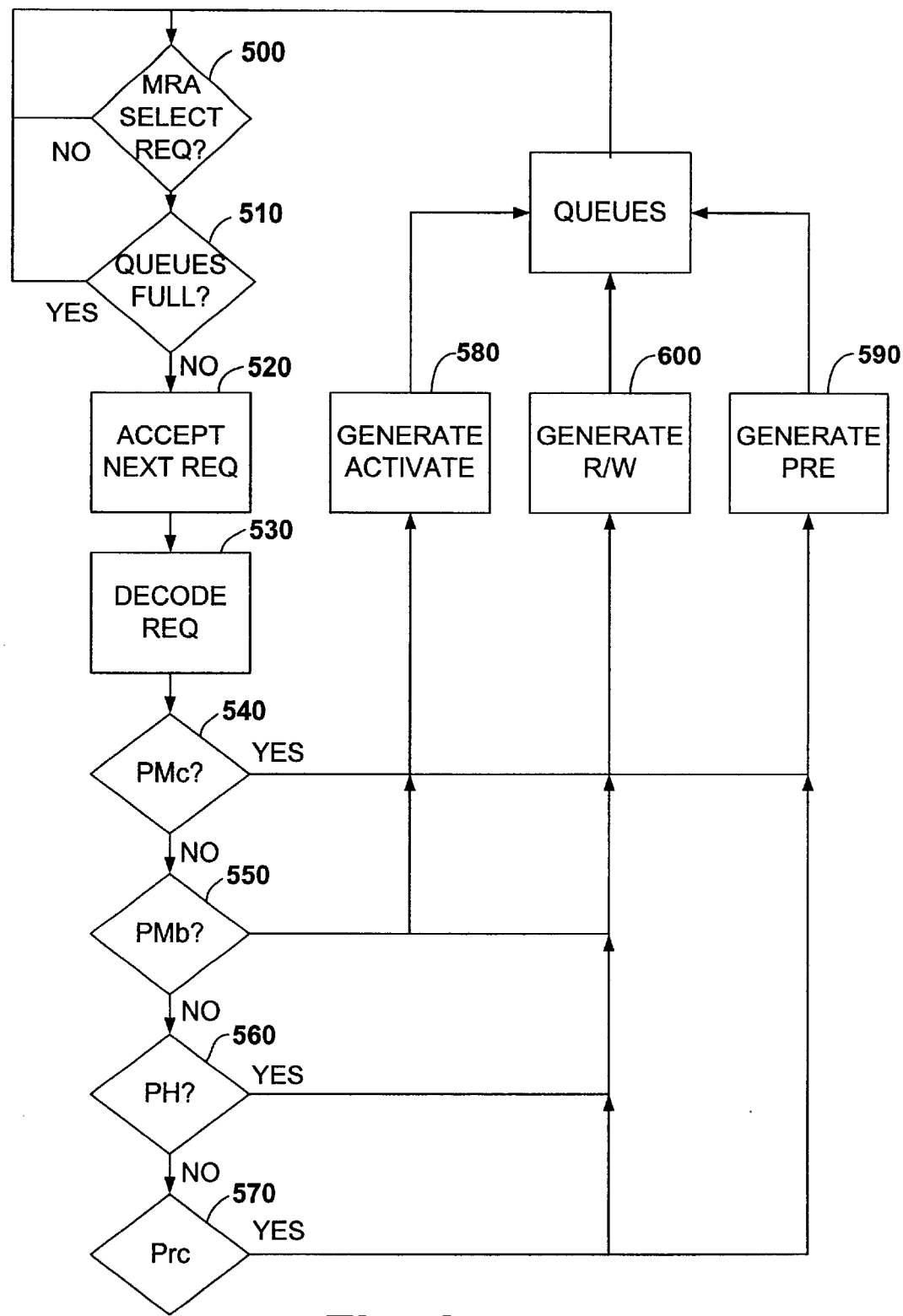
FIG. 3 is a flow chart depicting a method performed by the MRA unit depicted in FIG. 2.

Referring now to FIGS. 3, there is shown a detailed flow chart of the steps performed by the queue control logic 300 and the request decoder 310. The MRA 220 selects one memory request from the memory requestors 210 to be sent to the SMC 230 (Step 500). The queue control logic continually checks to see if the AQ 340, PQ 350 and RWQ 360 are full (Step 510). The operation queues are not full if, for the given memory request, there is at least one queue entry available in each operation queue for the necessary primitive memory operations for that request. If the operation queues are full, control returns to Step 500. If the queues are not full, the request decoder 310 accepts the next request (Step 520). The request decoder 310 then decodes the next request (Step 530) into the required primitive operations and queues the appropriate primitive operations into the AQ 340, PQ 350 and RWQ 360 (Steps 540–570) via the next request input 400. If the next request is a PMc (Step 540), an activate operation is generated and stored into the AQ 340 (Step 580), a pre-charge operation is generated and stored into the PQ 350 (Step 590) and a read/write operation is generated and stored into the RWQ 360 (Step 600). If the next request is a PMb (Step 550), an activate operation is generated and stored into the AQ 340 (Step 580) and a read/write operation is generated and stored into the RWQ 360 (Step 600). If the next request is a PH (Step 560), a read/write operation is generated and stored into the RWQ 360 (Step 600). If the next request is a Pre-charge (Step 570), a pre-charge operation is generated and stored into the PQ 350 (Step 590). In addition, a dummy placeholder RWQ 360 entry is stored into the RWQ 360 (Step 600) (See below). After all appropriate operations are generated and stored, control returns to Step 500.

Referring back to FIG. 2, each of the operation queues, the AQ 340, the PQ 350 and the RWQ 360 are connected to the SPM 370. The PQ 350 and RWQ 360 are also connected to the RWCQ 365. Each operation queue 340, 350, 360 operates independently to try and issue its queued operations onto the memory bus 100 in order to initiate the memory request. Further, each operation queue 340, 350, 360 is responsible for strictly adhering to timing and ordering dependencies and can only issue an operation when these dependencies are met. The SPM 370 selects an operation to be sent to the memory 70 and then dispatches it. When more than one queue wants to send an operation, the SPM 370 must choose one operation. In the exemplary SMC 230, the SPM 370 implements a priority based selection where PQ 350 entries marked hi priority (see below) take precedence over RWQ 360 entries which take priority over AQ 340 entries which take priority over normal PQ 350 entries. The operation queues 340, 350, 360 are interconnected with each other and the RWCQ 365 in order to track and properly issue operations currently in the operation queues 340, 350, 360 which are timing and order dependent on each other. Once the memory request is initiated, the RWCQ 365 is responsible for tracking the outstanding read or write operations that have been sent to the memory 70. The RWCQ 365 is also connected to the operation queues 340, 350, 360 and provides necessary information about historical operations so that the operation queues can determine when timing and ordering dependencies are met in relation to past operations.

The RWCQ 365 includes a valid read queue (VRd) 450, a valid write queue (VWr) 455 and control logic 460. In the exemplary SMC 230, the VRd 450 is twelve entries deep and the VWr queue 455 is eight entries deep. These queues shift their entries down on each clock cycle with the bottom entry shifting out of the queue. The VRd 450 also provides two additional queue slots 465 to remember the last two dequeued entries and the VWr provides one additional queue slot 470 to remember the last dequeued entry. These entries are provided for use by the operation queues 340, 350, 360 in resolving certain dependency issues as discussed below and detailed in FIGS. 4–13. For example, the PQ 350 must look at the second additional VRd queue slot 465 and the additional VWr queue slot 470 before sending a pre-charge operation so as not to pre-charge the CS 76 or bank which is currently in use.

When a read operation is dispatched to the memory 70 by the SPM 370, the control logic 465 loads the VRd 450 with control signals for use in the future when the data starts to return. When a write operation is dispatched to the memory 70 by the SPM 370, the control logic 465 loads the VWr 455 with control signals for use in the future when the memory is ready to receive the data to be written. The bottom entry of each queue represents the state of the SDRAM bus 100 in the current cycle and the necessary control signals to handle that state. On each cycle, as the VRd 450 and the VWr 455 shift down, the appropriate control signals for the current cycle enter the bottom queue entry and are dispatched to control the appropriate actions in the SMC 230 and data path control logic 380. An example is an eight quadword read operation where the SDRAM CAS latency is three cycles. Upon dispatch by the SPM 370 of the read operation, the top 8 entries of the VRd 450 are loaded by the control logic 465 with the proper control signals for handling each quadword of the read data when it starts to come in from the memory 70. The next three entries are set with control signals indicating no activity. The last entry is the bottom entry and it retains whatever operation is currently taking place. On each cycle, the entries shift down. With a CAS latency of three, it will take three cycles before data starts coming in from the memory following dispatch of the read operation. During these three cycles, the control signals indicating no activity are shifted out. After three cycles, the read control signals will have been shifted into the bottom queue entry and be ready for the data as it arrives from the memory 70. On each cycle thereafter, as each quadword comes in, the appropriate control signals will be available. In this way, the RWCQ 365 completes the memory request that was initiated by the operation queues 340, 350, 360.

FIG. 4 lists the SDRAM timing variables and dependencies that each operation queue must adhere to when sending operations to the memory 70. This table shows the timing variable, which operation queue is responsible for meeting this timing requirement, the expected latency, and a description of the requirement. The expected latency values are shown for Column Address Strobe (CAS or Tcl) timing of two cycles and three cycles. These timing variables are all based around the access characteristics of the particular SDRAM chips installed in the memory 70 as provided by the manufacturer. For example, the AQ 340 is responsible for waiting for Trp before sending an activate following a pre-charge. Trp is the delay required by the SDRAM chip between pre-charging a bank and then subsequently activating that same bank.

FIG. 5 lists high level ordering dependencies of each operation queue and lists which historical operations that each queue must look for. This table shows the request category (or scenario), PH, PMb, PMc or Pre. For each category, the table indicates whether the request is dependent on historical (previously transmitted) pre-charges, activates or read/write operations. The table also shows what primitive operations are queued up for each category.

FIG. 6 is a more detailed list of the queue ordering dependencies. This table lists the dependencies for each operation queue and then how that operation queue resolves its dependency in order to transmit the dependent operation. For example, a pre-charge operation is dependent on preceding read/write operations to that CS having been completed. The PQ 350 resolves this dependency by having the request decoder 310 in the MRA 220 add a dummy read/write operation into the RWQ 360 at the time the pre-charge is queued into the PQ 350. The pre-charge operation is tied to this dummy read/write and will not issue until the RWQ 360 attempts to send the dummy operation (which will simply be dequeued without doing anything). The RWQ 360 transmits queued read/write operations in order, therefore once the RWQ 360 clears the dummy read/write operation, the PQ 350 is free to send the pre-charge because all preceding read/writes must have been completed.

FIGS. 7–13 list the important signals generated by each of the queues and the fields of each queue entry for each queue. For each field, FIGS. 7, 9, 11 & 13 list the field name and a description of the information stored in that field. For each operation queue, FIGS. 8, 10 & 12 list signals generated by that operation queue, the purpose of the signal and how that signal is created. For example, the RWQ 360 generates a signal to the PQ 350 called RWQ_Pre which tells the PQ 350 when its dummy read/write entry has reached the bottom of the queue. This resolves the PQ's 350 read/write ordering dependency so that it can send the pre-charge operation. This signal is created by an "or" function of the bottom RWQ 360 queue entry's PRE and PMc fields. Some fields in the queues are actually counters which are used to resolve certain timing dependencies. For example, in the RWQ 360, there is a field called Trcd_Cnt. This field is responsive to the AQdep field. These fields combine together to ensure that for read/write operations requiring an activate operation, the read/write does not get sent to the memory before the necessary activate operation completes. Trcd_Cnt is a count down counter that is loaded with the value of Trcd when the RWQ 360 entry is queued and prevents the issue of the RWQ 360 entry as long as the value of the count is above zero. As long as the AQdep field is asserted, Trcd_Cnt will not count and AQdep is cleared when the SPM 370 accepts an activate operation from the AQ 340. Once the count is zero, the Trcd dependency has been met following the activate and the read/write operation can be sent to initiate the data transfer.

Each of the operation queues 340, 350, 360 are operation requesters. Whenever an operation requestor determines that it has an operation whose timing and ordering dependencies have been met, that requester will assert a signal to the SPM 370. This signal tells the SPM 370 that there is an operation ready to be sent. When more than one operation requestor is ready to send an operation, the SPM 370 selects the one operation with highest priority. The SPM 370 then sends a signal back the accepted requestor to indicate that the operation was accepted and that the requestor can dequeue the operation. Once accepted, the operation is transmitted to the memory 70 over the memory bus 100.

When a read or write operation is dispatched from the RWQ 360, the RWCQ 365 is appropriately loaded to reflect the outstanding operation so that it can be properly completed. As discussed earlier, the RWCQ 365 continually shifts its entries down and out of its queues with the bottom entry holding the appropriate control signals for the current state of the memory bus 100.

In this way, each operation queue is able to resolve timing and ordering dependencies and issue operations independently in order to initiate memory requests. Further, the control queue is able to easily complete the memory request by pre-setting control information for future activity and utilizing a simple shifting queue structure to dispatch the appropriate control signals at the right time. This allows for maximum performance through optimal utilization of the memory bus. Further, the simple queue structure results in a less complicated design in turn results in a reduction of the gate counts, the design time/cost and the number of design errors while increasing the speed of the logic. In addition, this simple queue structure provides a flexible design capable of working with a variety of memory architectures by simply altering the queue size or queue entry field contents.

It is intended that the foregoing detailed description be regarded as illustrative rather than limiting and that it is understood that the following claims including all equivalents are intended to define the scope of the invention.

We claim:

1. An apparatus to execute memory requests to a computer memory, said apparatus comprising:
   a request decoder operative to receive a memory request and decode said memory request into at least one primitive memory operation, and wherein said at least one primitive memory operation comprises an activate operation, a read/write operation and a pre-charge operation;
   at least one operation queue coupled to said request decoder operative to store said at least one primitive memory operation for transmission to said computer memory, and wherein said at least one operation queue comprises an activate queue, a read/write queue and a pre-charge queue, and wherein said activate queue has a queue depth of 1, said read/write queue has a queue depth of 3 and said pre-charge queue has a queue depth of 1;
   a multiplexor coupled to said at least one operation queue and said computer memory and operative to dequeue said at least one primitive memory operation from said at least one operation queue and transmit said at least one primitive memory operation to said computer memory to initiate said memory request; and
   at least one control queue coupled to said at least one operation queue and said computer memory and operative to complete said memory request, and wherein said at least one control queue comprises a read control queue and a write control queue.

2. The apparatus of claim 1, wherein said at least one operation queue is further operative to generate a ready signal to said multiplexor indicating that said at least one operation queue is ready to transmit said at least one primitive memory operation to said computer memory, and further wherein said multiplexor is responsive to said ready signal.

3. The apparatus of claim 2 wherein said at least one primitive memory operation comprises dependent ordering data and further wherein said at least one operation queue generates said ready signal from said dependent ordering data.

4. The apparatus of claim 3 wherein said at least one control queue is further operative to generate dependency signals to said at least one operation queue and further wherein said at least one operation queue generates said ready signal from said dependency signals.

5. The apparatus of claim 1, wherein said at least one operation queue, said multiplexor and said at least one control queue are interconnected to share operation dependency data, and further wherein said at least one operation queue and said multiplexor are responsive to said operation dependency data.

6. The apparatus of claim 1, wherein said multiplexor selects said at least one primitive memory operation based on a priority selection.

7. The apparatus of claim 1, wherein said read and write control queues are responsive to said read/write queue and operative to store read/write control data after said read/write primitive memory operations are transmitted to said computer memory.

8. The apparatus of claim 1, wherein said request decoder is implemented as combinational logic.

9. The apparatus of claim 1, wherein said request decoder comprises at least one register coupled to logic operative to decode said memory request into said at least one primitive memory operation and store said at least one primitive memory operation into said at least one queue.

10. An apparatus to execute memory requests to a computer memory, said apparatus comprising:
    a request decoder operative to receive a memory request and decode said memory request into at least one primitive memory operation, and wherein said at least one primitive memory operation comprises an activate operation, a read/write operation and a pre-charge operation;
    at least one operation queue coupled to said request decoder operative to store said at least one primitive memory operation for transmission to said computer memory, and wherein said at least one operation queue comprises an activate queue, a read/write queue and a pre-charge queue;
    a multiplexor coupled to said at least one operation queue and said computer memory and operative to dequeue said at least one primitive memory operation from said at least one operation queue and transmit said at least one primitive memory operation to said computer memory to initiate said memory request; and at least one control queue coupled to said at least one operation queue and said computer memory and operative to complete said memory request, and wherein said at least one control queue comprises a read control queue and a write control queue, and wherein said read control queue has a queue depth of twelve and said write control queue has a queue depth of eight.

11. A method for executing memory requests to a computer memory comprising the steps of:

accepting a memory request;

decoding said memory request into at least one primitive memory operation;

queuing said at least one primitive memory operation into at least one operation queue;

selecting said at least one primitive memory operation from said at least one operation queue for transmission to said computer memory, wherein said at least one primitive memory operation comprises a pre-charge operation, an activate operation and a read/write operation, and further wherein said at least one operation queue comprises a pre-charge queue, an activate queue and a read/write queue, wherein said pre-charge queue comprises one queue entry, said activate queue comprises one queue entry and said read/write queue comprises three queue entries;

dequeuing said at least one primitive memory operation from said at least one operation queue;

transmitting said at least one primitive memory operation to said computer memory to initiate said memory request;

queuing control data into at least one control queue;

completing said memory request to said computer memory; and dequeuing said control data as said memory request completes.

12. The method of claim 11, wherein said at least one primitive memory operation and said control data comprise inter-operation dependencies, said step of selecting further comprising the step of verifying that all inter-operation dependencies have been met.

13. The method of claim 11, wherein said at least one control queue comprises a read control queue and a write control queue.

14. The method of claim 11 further comprising the step of:

detecting that at least one queue entry of said at least one operation queue is available;

wherein said step of queuing said at least one primitive memory operation further comprises the step of checking for an available queue entry.

15. A queue based memory controller for receiving a memory request and completing said memory request to a computer memory, said controller comprising:

at least one operation queue comprising at least one queue entry to hold at least one primitive memory operation, wherein said at least one primitive memory operation comprises a pre-charge operation, an activate operation and a read/write operation, and wherein said at least one operation queue comprises a pre-charge queue, an activate queue and a read/write queue, and wherein said pre-charge queue has a queue depth of 1, said activate queue has a queue depth of 1 and said read/write queue has a queue depth of 3;

a request decoder operative to receive said memory request and decode said memory request into said at least one primitive memory operation and further operative to store said at least one primitive memory operation into said at least one operation queue;

a multiplexor coupled to said at least one operation queue and said computer memory and operative to select said at least one primitive memory operation from said at least one operation queue for transmission to said computer memory to initiate said memory request and further operative to dequeue said selected at least one primitive memory operation; and at least one control queue coupled to said at least one operation queue and said computer memory and operative to store control data, said control data operative to control completion of said memory request in said memory.

16. The queue based memory controller of claim 15, wherein said at least one operation queue further comprises dependency data for said at least one queue entry and said request decoder is further operative to set said dependency data, and further wherein said multiplexor is responsive to said dependency data when selecting said at least one primitive memory operation for transmission.

17. The queue based memory controller of claim 16 wherein said dependency data comprises operation timing dependencies and operation ordering dependencies.

18. The queue based memory controller of claim 17 wherein said at least one control queue and said at least one operation queue are further operative to generate dependency data signals and wherein said at least one operation queue is further responsive to said dependency data signals.

19. The queue based memory controller of claim 15, wherein said request decoder is implemented as combinational logic.

20. The queue based memory controller of claim 15, wherein said request decoder comprises at least one register coupled to logic operative to decode said memory request into said at least one primitive memory operation and store said at least one primitive memory operation into said at least one queue.

* * * * *

UNITED STATES PATENT AND TRADEMARK OFFICE
CERTIFICATE OF CORRECTION

PATENT NO. : 6,295,586 B1
DATED : September 25, 2001
INVENTOR(S) : Stephen T. Novak, Scott Waldron and John C. Peck, Jr.

It is certified that error appears in the above-identified patent and that said Letters Patent is hereby corrected as shown below:

<u>Column 5,</u>
Line 9, please replace the numeral "10" with the numeral -- 110 --.

Signed and Sealed this

Ninth Day of April, 2002

*Attest:*

*Attesting Officer*

JAMES E. ROGAN
*Director of the United States Patent and Trademark Office*